United States Patent [19]
Bramlett

[11] Patent Number: 5,790,670
[45] Date of Patent: Aug. 4, 1998

[54] APPARATUS AND METHOD FOR SECURING ELECTRONIC CIRCUITRY

[75] Inventor: Lawrence Bramlett, Lake Forest, Calif.

[73] Assignee: Citicorp Development Center, Inc., Los Angeles, Calif.

[21] Appl. No.: 683,720

[22] Filed: Jul. 18, 1996

[51] Int. Cl.$^6$ .............................. H04L 9/00; H01H 27/10; H02B 1/20

[52] U.S. Cl. ................... 380/52; 200/43.09; 361/654; 361/672

[58] Field of Search ........................... 380/10, 9, 52; 361/654, 672; 200/43.09; 348/5.5

[56] References Cited

U.S. PATENT DOCUMENTS 4,149,158  4/1979  Iwaoka et al. .

*Primary Examiner*—Stephen C. Buczinski
*Attorney, Agent, or Firm*—Blakely Sokoloff Taylor & Zafman

[57] ABSTRACT

An apparatus for protecting the confidentiality and security of sensitive data which has been encrypted as it is being processed in data communications systems. The apparatus uses a metallic plate which covers the encryption circuitry and a memory in which the encryption key is stored and includes circuitry which erases the stored encryption key when an attempt is made to remove the protective cover. The metallic plate is formed into top and bottom cover plates for the top side and bottom side respectively of a printed circuit board which are secured together with a screw. An integrated circuit, which is located within the top and bottom cover plates stores the encryption key, an erase circuit and a switch which changes position when the screw is rotated causing a signal to be generated by the erase circuit which erases the encryption key stored in the integrated circuit.

8 Claims, 3 Drawing Sheets

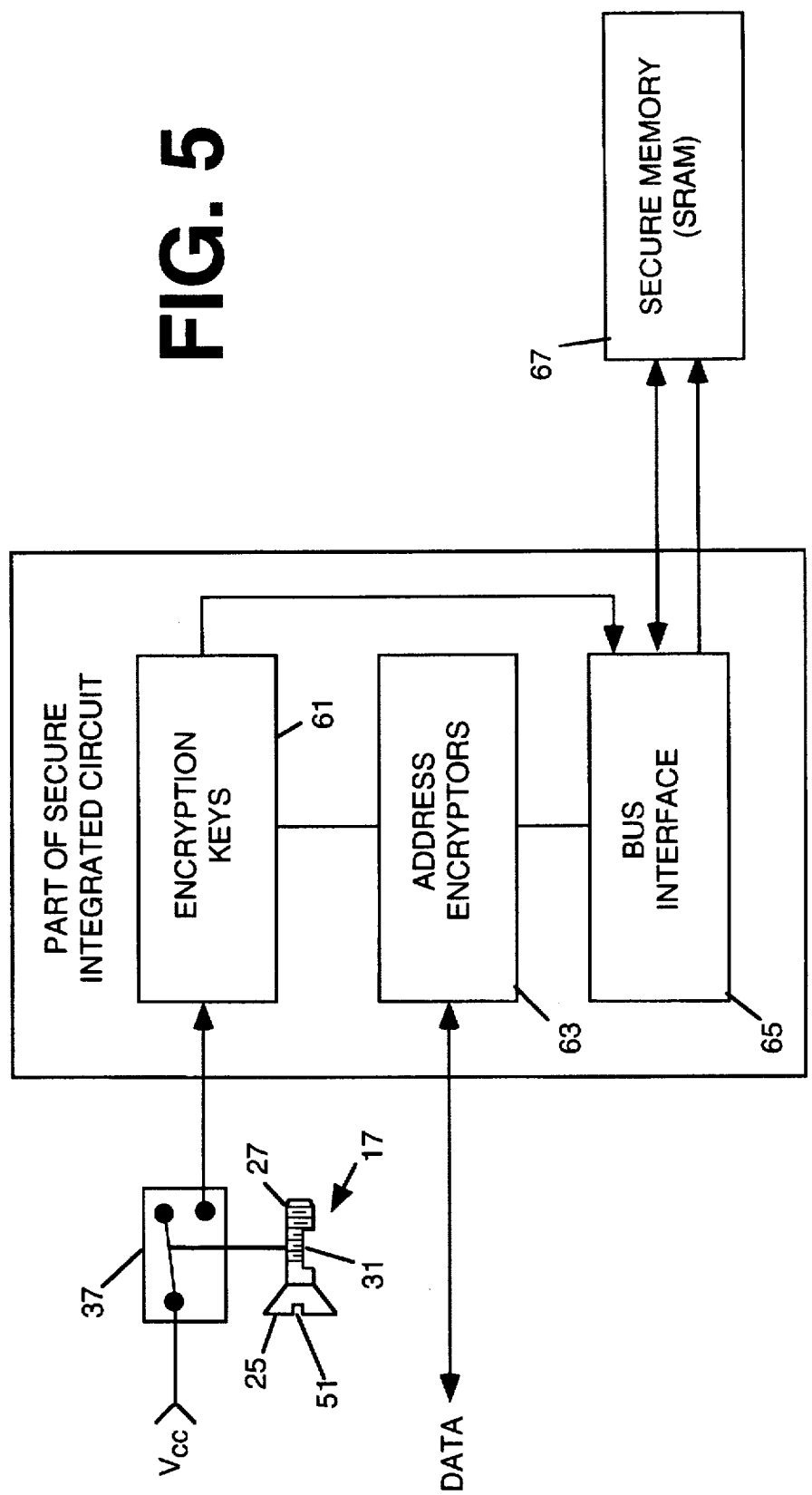

5,790,670

APPARATUS AND METHOD FOR SECURING ELECTRONIC CIRCUITRY

BACKGROUND OF THE INVENTION

Banks and other institutions must transmit sensitive or confidential data from one location to another using data communications equipment. The existence of electronic communication and processing of sensitive/confidential data makes it necessary to secure such data from being obtained by unauthorized entities during such communication and processing.

One of the foundations of securing such information is the use of electronic data encryption/decryption. Typically, such equipment includes encryption circuitry for encrypting the sensitive or confidential data and requires a key to decrypt the data for actual use. Due to the physical nature of electronic circuitry and components it is also necessary to secure encryption keys from the possibility of mechanical or electrical intrusion. Specifically, the problem is that such keys must be stored in a memory or other device which can be electrically probed thereby enabling the encryption key to be ascertained for subsequent use by unauthorized parties to enable them to decrypt the sensitive or confidential information.

SUMMARY OF THE INVENTION

The present invention provides a mechanism for protecting the confidentiality and security of sensitive data which has been encrypted as it is being processed in data communications systems.

The present invention provides a metallic plate which covers the encryption circuitry and memory in which the encryption key is stored and includes circuitry which erases the stored encryption key when an attempt is made to remove the protective cover.

The elements of the invention are top and bottom cover plates for the top side and bottom side respectively of a printed circuit board which are secured together with a screw, an integrated circuit covered by the cover plates for storing the encryption key, an erase circuit and a switch which changes position when the screw is rotated causing a signal to be generated by the erase circuit which erases the encryption key stored in the integrated circuit.

BRIEF DESCRIPTION OF THE DRAWINGS

FIG. 5 is a block diagram of a portion of a protection circuit and its relationship to the switch and security screw.

DETAILED DESCRIPTION OF THE INVENTION

A circuit substrate is disclosed with electronic components and an interlock-snap action switch enclosed between two metallic plates secured in place (sandwiching a circuit board on which the components are mounted) with a single CAM action security screw.

An attempt to remove the two metallic plates (via attempting to remove the security screw) causes a destruct circuit to become enabled. The destruct circuit, once enabled, destroys sensitive electronically stored information, such as an encryption key, which is required to decrypt the encrypted data.

Figure 1:
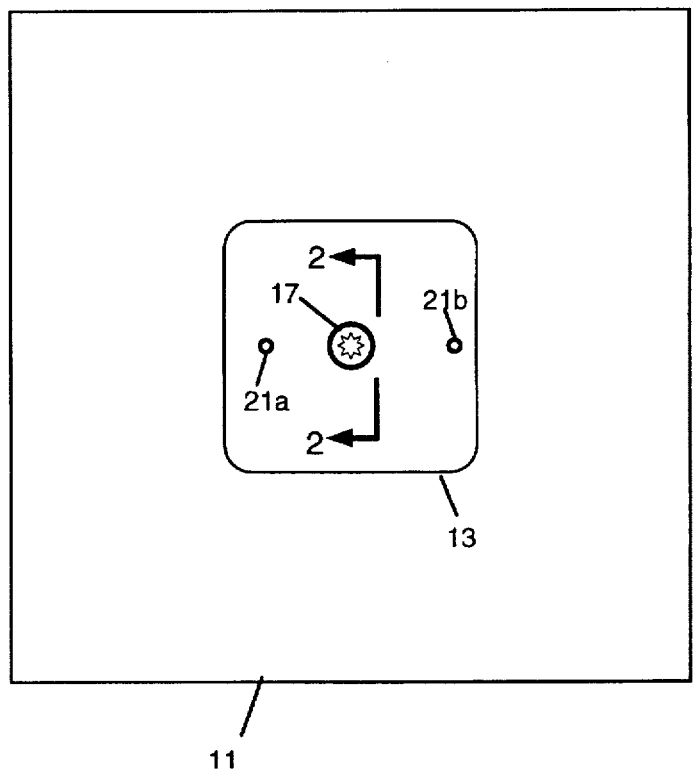
FIG. 1 is top view of a circuit board having components to be protected and a top side cover plate used in the present invention.

Referring to FIG. 1, a printed circuit board 11 is shown onto which electronic components (not shown) to be protected by the invention are mounted. FIG. 1 shows the printed circuit looking down onto it so that top cover plate 13 appears secured to bottom cover plate (not shown) by security screw 17. The bottom cover plate is mounted on the other side of the printed circuit board so that it is aligned with top cover plate 13. In this connection, anti-rotation alignment pins are inserted into corresponding holes in the bottom cover plate and held in place by, for example, utilizing a press fit with a high pressure force to effectively bond the pins to the cover plate. The top plate similarly has installed a set of corresponding sockets, the tops of which are designated by reference numbers 21a and 21b in FIG. 1, into which the alignment pins fit so that the top and bottom cover plates are maintained in alignment as security screw 17 is turned to secure the two cover plates to the printed circuit board. Preferably, the alignment pins and corresponding sockets are asymetrical with respect to screw 17 to ensure that the top and bottom cover plates are properly oriented so that notch 51 and dimple 53 described with reference to FIG. 4 operate as described.

The two cover plates each are provided with a flange around their entire perimeter so that when the bottom of each flange is in tight contact with the printed circuit board, there is sufficient clearance between the inside surface of the plates and the components mounted on the printed circuit board to prevent contact between the components and the cover plates. Typically, the top cover plate requires more clearance than the bottom cover plate since the components forming the circuit are mounted on the topside of the printed circuit board and the pads and traces on the bottom side of the printed circuit board require very little clearance. The dimensional tolerances of the flange lengths should be such that when the two plates are tightened down onto the printed circuit board, it is not possible to slip a probe under either plate so that it can reach circuitry under either plate. If the plates are rectangular in shape such that bending of the plates to form flanges leaves a space in each corner, the corners should be welded closed so that there are no spaces for a probe to be inserted. This problem can be avoided if the cover plates are generally circular in shape, or at least have rounded corners, so that formation of the flanges does not leave any gaps. Additionally, a circularly shaped cover plate would not have any corners which could possibly be pried away from the printed circuit board to allow entry of a probe.

The cover plates should be electrically conductive so that signals cannot be picked up by a probe outside the cover plates and should be sufficiently stiff so that the force needed to pry the covers away from the printed circuit board would destroy the printed circuit board. The specific construction of the cover plates would depend on the amount of printed circuit board area which needs to be protected. Suitable materials for the cover plates are steel or hardened steel with a zinc or other protective plating. It is preferable that the cover plates and any protective coating be electrically conductive so that if an attempt is made to drill or machine the cover plates in an attempt to get at the protected circuit, the resulting residue will be made of a conductive material which, if it lands on the circuit, will likely create an electrical short disrupting the operation of the circuit so that it cannot be reliably probed. A typical thickness for covering nine to ten square inches of printed circuit board area so that the edges could not be pried away from the board without breaking the board would be between approximately 0.045 and 0.060 inch thick cold roll steel (16–18 gauge). ASTM A366.

Figure 2:
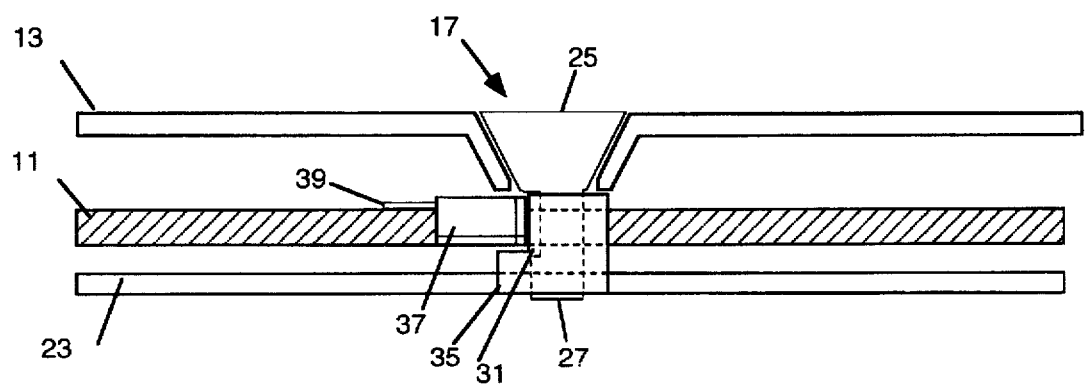
FIG. 2 is a side view taken along line 2—2 of FIG. 1.

Referring now to FIG. 2 which is a section taken along line 2—2 of FIG. 1, further details concerning security screw 17 will be described. FIG. 2 shows top plate 13 and bottom plate 23 sandwiching printed circuit board 11. Screw 17 is formed by head 25 and body 27. Body 27 is generally cylindrical in shape with threads as in a typical metal screw where a nut is used to engage the threads. The security screw of the present invention differs from a standard screw by having a cutout portion 31 as best seen in FIG. 5. Preferably, screw 17 is a tamper-resistant flat head steel alloy screw (AIS 4037), RC hardness 38–44 with Torx drive. The depth of cutout 31 is not critical so long as it can function as described below. Generally L-shaped standoff 35 is threaded to match the threads of screw 17. Standoff 35 functions as a corresponding nut for screw 17. Although a standard hex nut could be used, stand-off 35 prevents screw 17 from being tightened down too much as its top edge hits the bottom of head 25 of screw 17. Additionally, the standoff is L-shaped to provide access for arm 41 of switch 37 as described below. Also shown in FIG. 2 is switch 37 having leads 39, the function of which will be described below.

Figure 3:
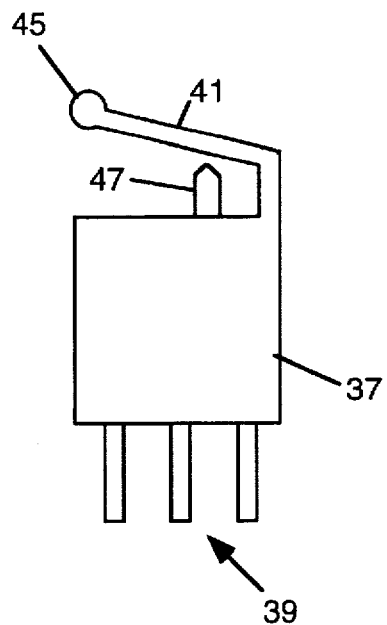
FIG. 3 is a side view of a subminiature switch which may be used in the present invention

Switch 37 will now be described with reference to FIG. 3. Switch 37 is a small micro-switch such as a subminiature basic switch having a leaf lever and straight terminals such as D2MQ-1L available from Omron. Switch 37 includes an arm 41 which can be moved when a force is applied at or near its end 45 to move the arm towards button 47. Switch 37 is connected so that it is normally open when button 47 is depressed. That is, when arm 41 is forced against button 47, the switch provides an open connection between one pair of its leads 39, otherwise, there is a closed connection between those leads. Button 47 is spring loaded and pops-up when pressure is not being applied by arm 41. Thus, when the force is removed from arm 41, it springs back to the position shown in FIG. 3 thereby releasing button 47 creating a closed circuit.

Figure 4:
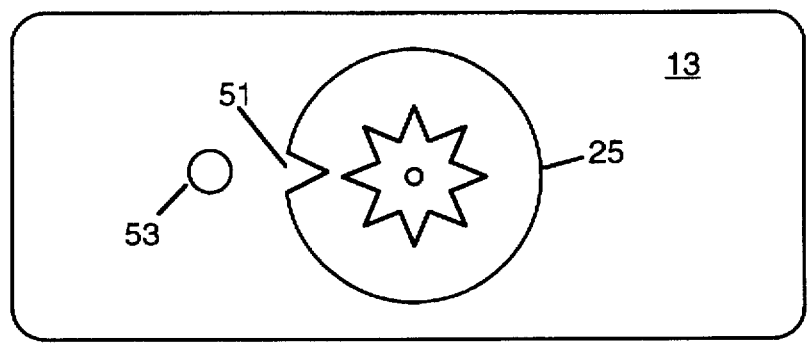
FIG. 4 is a detailed view of a security screw of the type used in the invention from the top.

FIG. 4 shows additional details of security screw 17. FIG. 4 is a view of the portion of top cover plate 13 in the immediate vicinity of screw 17. The additional details which do not appear in FIG. 1 are a notch 51 in the head 25 of screw 17 and a dimple 53 in top cover plate 13. The notch on the head of screw 17 is arranged so that when it lines up with dimple 53, the body of screw 17 opposite cutout portion 31 presses against arm 41 so that button 47 is depressed. As screw 17 rotates, it should be noted that cutout 31 of screw 17 will rotate around so that within a 180° rotation, arm 41 moves away from button 47 causing button 47 to be released.

Operation of the protection circuitry will now be described with reference to FIG. 5. The specifics of the encryption of the data, storing of the key and the like are based upon well known techniques readily available to persons skilled in the art, and therefore, need not be detailed herein. However, in general, the purpose of an encryption circuit is to provide an array of mechanisms which are designed to resist most, if not all, attempts to access data and signals protected by the circuit. Application software is loaded and executed by the circuit in encrypted form. The encrypted data is stored in a memory external to the encryption circuit, but within the area covered by the protective covers. An encryption algorithm uses an internal stored and protected key such that any attempt to discover the key value results in its destruction rendering the encrypted contents of the external memory useless. Preferably, the encryption algorithm should incorporate the encryption key using an on-board key value. The key should only be capable of being loaded from an on-chip true random number generator so that the true key value is never known by the user. A self destruct input pin is provided so that, a change in the state of $V_{cc}$, i.e., a change from a high level to a low level or vise versa, activates a self destruct circuit associated with the pin which causes immediate erasure of the key and other elements of the integrated circuit.

The protection circuit utilizes a commercially available encryption integrated circuit forming a microcontroller such as a Dallas Semiconductor DS5002 which includes encryption keys 61, address encryptors 63 and a bus interface 65. Memory 67, which is typically implemented as an SRAM (static random access memory), is coupled to bus interface 65. Again, the specifics of the operation of the integrated circuit and SRAM are well known in the art. The circuit operates normally so long as switch 37 is open, i.e., button 47 is depressed. In this case, voltage on the circuit board (Vcc) is not provided to self-destruct circuitry and possibly other elements of the protected circuit forming part of the encryption integrated circuit connected to encryption keys 61. However, if screw 17 is rotated in an attempt to remove cover plates 13 and 23, before the screw can be rotated 180°, the cutout portion of the body of screw 17 will retract arm 41 thereby releasing button 47. When button 47 is released, switch 37 closes causing $V_{cc}$ to be applied to the self-destruct circuitry and possibly other elements of the protected circuit forming part of the encryption integrated circuit connected to encryption keys 61 which causes encryption keys 61 to be erased so that once the cover plates are removed, the keys cannot be recovered and the data cannot be decrypted by unauthorized persons.

In order to install the protective cover plates, all components should be mounted on printed circuit board 11 including switch 37 and the encryption integrated circuit. Prior to installation of the two cover plates, power is not applied to the circuit. Initially, arm 41 is held depressed by a finger, clip or the like so the it is not damaged prior to the insertion of screw 37. Then, top cover plate 13 is set into place. While holding top cover plate 13 in place, security screw 17 is seated into top cover plate 13 at which point arm 41 may be released. Then bottom cover plate 23 is brought up into position. Once bottom cover plate 23 is in position, security screw 17 is turned in a clockwise direction and torqued to a predetermined value until notch 51 is aligned with node 53. Screw 17 should only be turned clockwise until a predetermined torque value has been reached when notch 51 is aligned with hole 53 since a counter-clockwise rotation will likely break arm 41 as the cutout portion of the body of the screw would turn into the free end of arm 41. Once the top and bottom cover plates are in place, and screw 17 has been tightened, power can be applied to the circuit and programming of the chip performed as required by the particulars of the secure integrated circuit which is utilized. Typically, the secure data and software is loaded into nonvolatile RAM which is encrypted by a key and address dependent encryptor circuit. The key is automatically generated by ROM firmware just prior to the loading of the software. After loading is complete, the key is protected by setting an on-chip security lock. The particulars of the implementation of the secure integrated circuit and the additional protection provided by it are well known in the art.

Regarding the predetermined torque applied to screw 17, such torque should be sufficient to hold the top and bottom plates in place so that the edges of both the top and bottom cover plates lie flush against the printed circuit board so that the covers do not have any free play. A typical minimum torque value would be four inch pounds.

I claim:

1. An apparatus for protecting encrypted data from unauthorized decryption comprising:

a) a first cover disposed adjacent a first surface of a circuit board;

b) a second cover disposed adjacent a second surface of said circuit board;

c) a screw which passes through said first cover, said circuit board and said second cover, said screw threadedly coupled to a nut for holding said first cover and said second cover in place relative to said circuit board;

d) a switch coupled to an encryption circuit disposed between said first and second covers, said switch being in one of an open position and a closed position and in communication with said screw, wherein when said screw is rotated said switch causes a signal to be applied to said encryption circuit which causes said circuit to be destroyed when said switch is in one of said open and closed positions.

2. The apparatus defined by claim 1 wherein said screw includes a notch on its head and said first cover includes alignment means for alignment with said notch to indicate a rotational position of said screw in which said signal is not applied to said encryption circuit.

3. The apparatus defined by claim 1 wherein said screw includes a cutout portion in its body, said cutout portion causing said switch to open and close as said screw is being rotated.

4. The apparatus defined by claim 3 wherein said switch includes an arm which is disposed adjacent said cutout portion and a button which is depressed by movement of said arm, wherein when said screw is in a first position, said arm is disposed adjacent said cutout portion causing said button to be released, and when said screw is in a second position, said arm is disposed adjacent said body causing said button to be depressed.

5. The apparatus defined by claim 1 wherein said screw is a tamper-resistant steel alloy screw.

6. The apparatus defined by claim 1 wherein said first and second covers have electrically conductive tops and bottoms.

7. The apparatus defined by claim 1 wherein said nut is L-shaped such that a top of one leg of said L is disposed adjacent a bottom surface of a head of said screw when said first cover and said second cover are in place relative to said circuit board.

8. A method for protecting encrypted data from unauthorized decryption comprising the steps of:

a) placing a first cover adjacent a first surface of a circuit board and a second cover adjacent a second surface of said circuit board;

b) coupling said first and second covers together with a screw which passes through said first cover, said circuit board and said second cover and which treads onto a corresponding nut;

c) applying to an encryption circuit within said covers a signal which destroys sensitive electronically stored information when a switch is in one of an open position and a closed position as a function of the rotational position of said screw.

* * * * *